US008566596B2

(12) United States Patent
Stephenson et al.

(10) Patent No.: US 8,566,596 B2
(45) Date of Patent: Oct. 22, 2013

(54) PRE-ASSOCIATION MECHANISM TO PROVIDE DETAILED DESCRIPTION OF WIRELESS SERVICES

(75) Inventors: David Stephenson, San Jose, CA (US); Esteban Raul Torres, San Francisco, CA (US); Joseph Salowey, Seattle, WA (US); Chetin Ersoy, Portsmouth, NH (US); Nancy Cam-Winget, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 134 days.

(21) Appl. No.: 12/862,149

(22) Filed: Aug. 24, 2010

(65) Prior Publication Data

US 2012/0054106 A1    Mar. 1, 2012

(51) Int. Cl.
*H04L 9/32*    (2006.01)
(52) U.S. Cl.
USPC ........ 713/176; 713/175; 713/168; 705/14.58; 705/14.64; 705/14.65; 705/14.66
(58) Field of Classification Search
USPC .................. 705/14.58, 14.64, 14.65, 14.66; 713/175, 176
See application file for complete search history.

(56) References Cited

U.S. PATENT DOCUMENTS

| | | | | |
|---|---|---|---|---|
| 5,857,023 | A * | 1/1999 | Demers et al. ................. | 705/78 |
| 5,931,947 | A * | 8/1999 | Burns et al. .................... | 726/4 |
| 6,757,824 | B1 * | 6/2004 | England ......................... | 713/156 |
| 6,948,061 | B1 * | 9/2005 | Dierks .......................... | 713/159 |
| 6,968,460 | B1 * | 11/2005 | Gulick .......................... | 713/194 |
| 6,978,365 | B2 * | 12/2005 | England ........................ | 713/156 |
| 7,032,110 | B1 * | 4/2006 | Su et al. ........................ | 713/156 |
| 7,246,236 | B2 * | 7/2007 | Stirbu .......................... | 713/168 |
| 7,395,428 | B2 * | 7/2008 | Williams et al. ............... | 713/170 |
| 7,444,372 | B2 * | 10/2008 | Gupta et al. ................... | 709/203 |
| 7,568,223 | B2 * | 7/2009 | Sprunk et al. .................. | 726/10 |
| 7,660,844 | B2 * | 2/2010 | Takase et al. .................. | 709/203 |
| 7,752,443 | B2 * | 7/2010 | Genty et al. ................... | 713/170 |
| 7,769,690 | B2 * | 8/2010 | Dare et al. ..................... | 705/50 |
| 7,966,487 | B2 * | 6/2011 | Engberg et al. ................ | 713/156 |

(Continued)

FOREIGN PATENT DOCUMENTS

WO    WO 03007553      1/2003
WO    WO 2007-080490   7/2007

(Continued)

OTHER PUBLICATIONS

PCT/US10/43005 International Search Report and Written Opinion of the International Searching Authority dated Mar. 15, 2011.

(Continued)

*Primary Examiner* — Mamon Obeid
(74) *Attorney, Agent, or Firm* — Tucker Ellis LLP

(57) ABSTRACT

In an example embodiment, an apparatus comprising a transceiver configured to send and receive data and logic coupled to the transceiver. The logic is configured to determine from a signal received by the transceiver whether an associated device sending the signal supports a protocol for advertising available services. The logic is configured to send a request for available services from the associated device via the transceiver responsive to determining the associated device supports the protocol. The logic is configured to receive a response to the request via the transceiver, the response comprising at least one service advertisement and a signature. The logic is configured to validate the response by confirming the signature.

11 Claims, 10 Drawing Sheets

(56) References Cited

U.S. PATENT DOCUMENTS

| | | | |
|---|---|---|---|
| 7,974,405 B2* | 7/2011 | Furukawa et al. | 380/28 |
| 8,001,381 B2* | 8/2011 | Metke et al. | 713/169 |
| 8,112,786 B2* | 2/2012 | Nakamura et al. | 726/1 |
| 8,141,131 B2* | 3/2012 | Nakamura et al. | 726/1 |
| 8,176,328 B2* | 5/2012 | Chen et al. | 713/176 |
| 8,275,672 B1* | 9/2012 | Nguyen et al. | 705/26.41 |
| 8,386,776 B2* | 2/2013 | Gomi et al. | 713/156 |
| 8,392,289 B1* | 3/2013 | Nguyen | 705/26.81 |
| 2003/0009694 A1* | 1/2003 | Wenocur et al. | 713/201 |
| 2003/0204742 A1* | 10/2003 | Gupta et al. | 713/200 |
| 2003/0212888 A1* | 11/2003 | Wildish et al. | 713/158 |
| 2003/0236857 A1* | 12/2003 | Takase et al. | 709/217 |
| 2004/0083386 A1 | 4/2004 | Marquet et al. | |
| 2004/0117486 A1* | 6/2004 | Bourne et al. | 709/228 |
| 2004/0250085 A1* | 12/2004 | Tattan et al. | 713/186 |
| 2005/0005161 A1* | 1/2005 | Baldwin | 713/200 |
| 2005/0021969 A1* | 1/2005 | Williams et al. | 713/176 |
| 2005/0044369 A1* | 2/2005 | Anantharaman | 713/176 |
| 2005/0135606 A1* | 6/2005 | Brown | 380/28 |
| 2006/0067526 A1* | 3/2006 | Faccin et al. | 380/46 |
| 2007/0026499 A1 | 2/2007 | Otte et al. | |
| 2007/0061204 A1* | 3/2007 | Ellis et al. | 705/14 |
| 2008/0059300 A1* | 3/2008 | Hamoui | 705/14 |
| 2008/0301793 A1* | 12/2008 | Kim et al. | 726/10 |
| 2009/0106557 A1* | 4/2009 | Leonard | 713/179 |
| 2009/0132813 A1* | 5/2009 | Schibuk | 713/158 |
| 2009/0245133 A1 | 10/2009 | Gupta et al. | |
| 2009/0299836 A1* | 12/2009 | Sachs et al. | 705/14.4 |
| 2010/0146272 A1 | 6/2010 | Centonza et al. | |
| 2010/0268650 A1* | 10/2010 | Dare et al. | 705/71 |
| 2010/0325437 A1* | 12/2010 | Dare et al. | 713/175 |
| 2010/0325439 A1* | 12/2010 | Dare et al. | 713/176 |
| 2010/0332839 A1* | 12/2010 | Dare et al. | 713/175 |
| 2011/0096927 A1* | 4/2011 | Baek et al. | 380/270 |
| 2011/0145065 A1* | 6/2011 | Mustafa | 705/14.53 |
| 2011/0314346 A1* | 12/2011 | Vas et al. | 714/49 |
| 2013/0007460 A1* | 1/2013 | Dare et al. | 713/175 |

FOREIGN PATENT DOCUMENTS

| | | |
|---|---|---|
| WO | WO 2007/080490 | 7/2007 |
| WO | WO 2007/112764 | 10/2007 |
| WO | WO 2009/120466 | 10/2009 |
| WO | WO 2009-120466 | 10/2009 |

OTHER PUBLICATIONS

U.S. Appl. No. 12/057,156, filed Mar. 27, 2008, Torres et al.
U.S. Appl. No. 12/613,784, filed Nov. 6, 2009, Burns et al.
U.S. Appl. No. 12/862,170, filed Aug. 24, 2010, Stephenson et al.
Extended European Search Report mailed Feb. 16, 2012, for the related European Patent Application No. 11177825.4.
IEEE Standard Jun. 15, 2010, "IEEE Draft Standard for Information Technology-Telecommunications and Information Exchange Between Systems-Local and Metropolitan Networks-Specific Requirements-Part II" pp. 1-186.
IEEE, "Probe Response Authentication" Nov. 3, 2006, pp. 1-9.
Tuomas Aura et al. "Stateless Connections" Proceedings of International Conference on Information and Communications Security, ICICS Nov. 1, 1997, pp. 87-97.
Cisco—White Paper: "The Future of Hotspots: Making Wi-Fi as Secure and Easy as Use as Cellular" Jun. 10, 2011, pp. 5-6.
PCT/US10/43005 International Preliminary Report on Patentability and Written Opinion dated May 18, 2012.

* cited by examiner

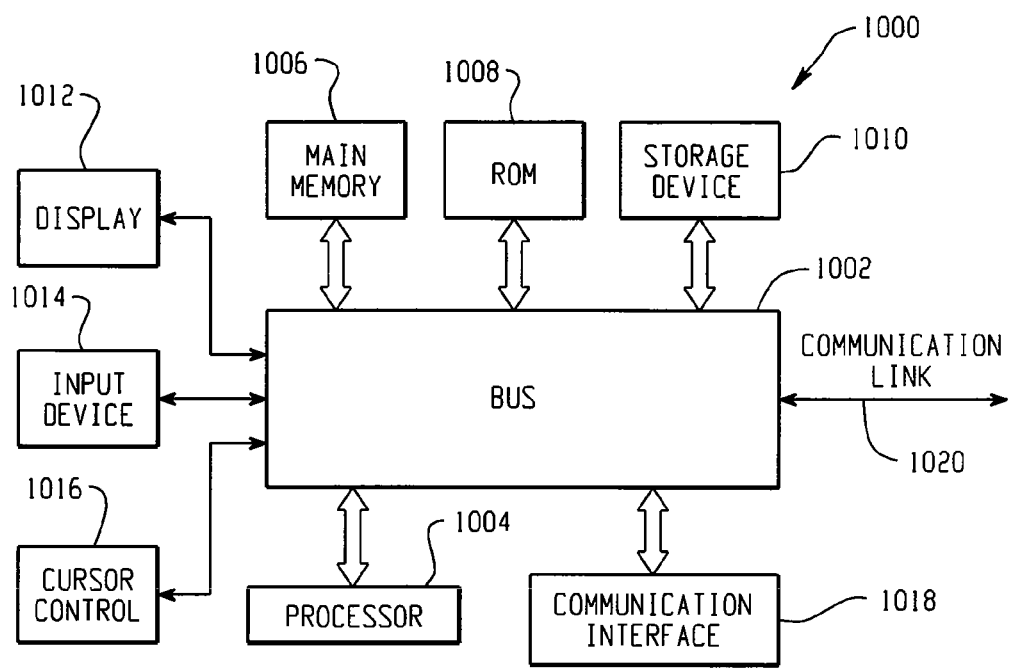
Fig. 10
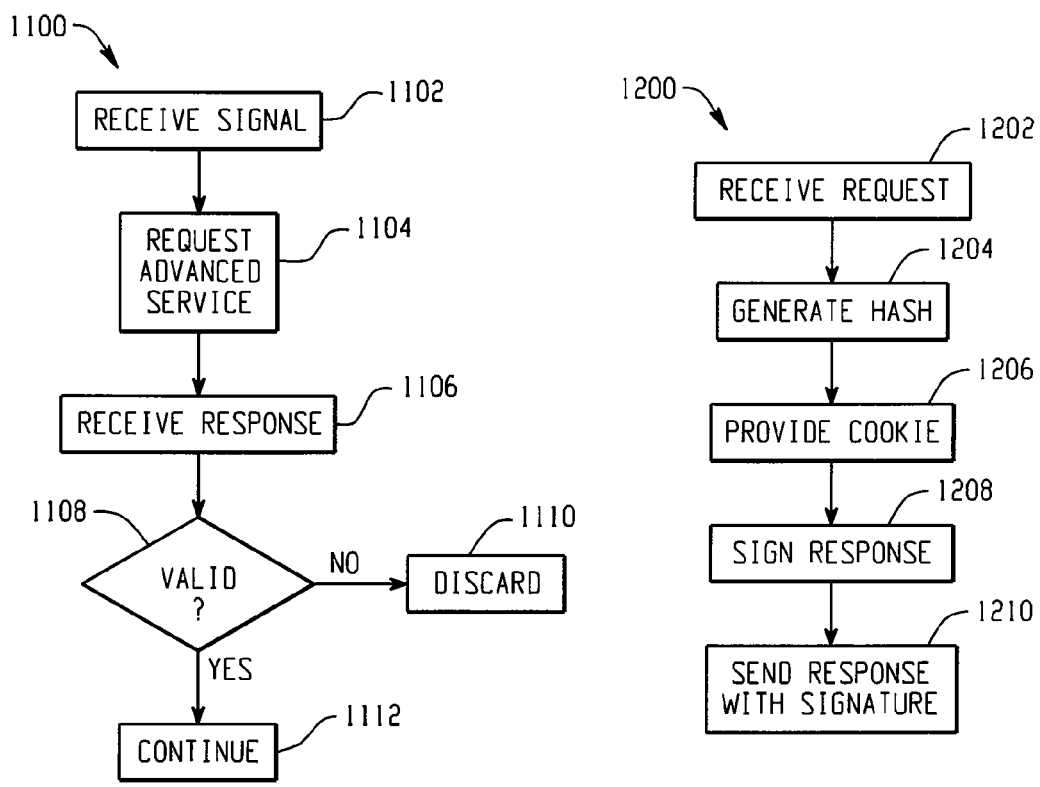
Fig. 11
Fig. 12

PRE-ASSOCIATION MECHANISM TO PROVIDE DETAILED DESCRIPTION OF WIRELESS SERVICES

TECHNICAL FIELD

The present disclosure relates generally to authentication of services advertised by a network.

BACKGROUND

A Mobility Services Advertisement Protocol (MSAP), such as a Concierge Service, creates some very interesting opportunities, allowing the next generation of devices, such as smart phones, to automatically present services provided by a Wireless Local Area Network (WLAN) without the need for a user to perform complex configuration of the device or to perform a search (e.g., Google search) for a service. Note that local services, e.g., services provided in a public venue such as a sports stadium using servers protected from the Internet by a firewall, are generally not searchable anyway because they cannot be indexed via the public internet. For example, a WLAN employing a mobile Concierge Service can advertise network services along with a provider of the services. A mobile device receiving an advertisement may output (for example display and/or provide an audiovisual signal, etc.) the advertised service on the mobile device allowing a user associated with the mobile device to access the advertised service. It also creates, however, a potential for abuse, for example spoofed applications may be masquerading as legitimate applications, spoofed applications may be employed for luring potential victims and/or create a potential vulnerability to spam attacks.

BRIEF DESCRIPTION OF THE DRAWINGS

The accompanying drawings incorporated herein and forming a part of the specification illustrate the examples embodiments.

FIG. 10 illustrates an example of a computer system upon which an example embodiment may be implemented.

FIG. 11 illustrates an example of a methodology performed by a mobile device to obtain network advertising services.

FIG. 12 illustrates an example of a methodology performed by a server to provide advertising services.

OVERVIEW OF EXAMPLE EMBODIMENTS

Figure 1:
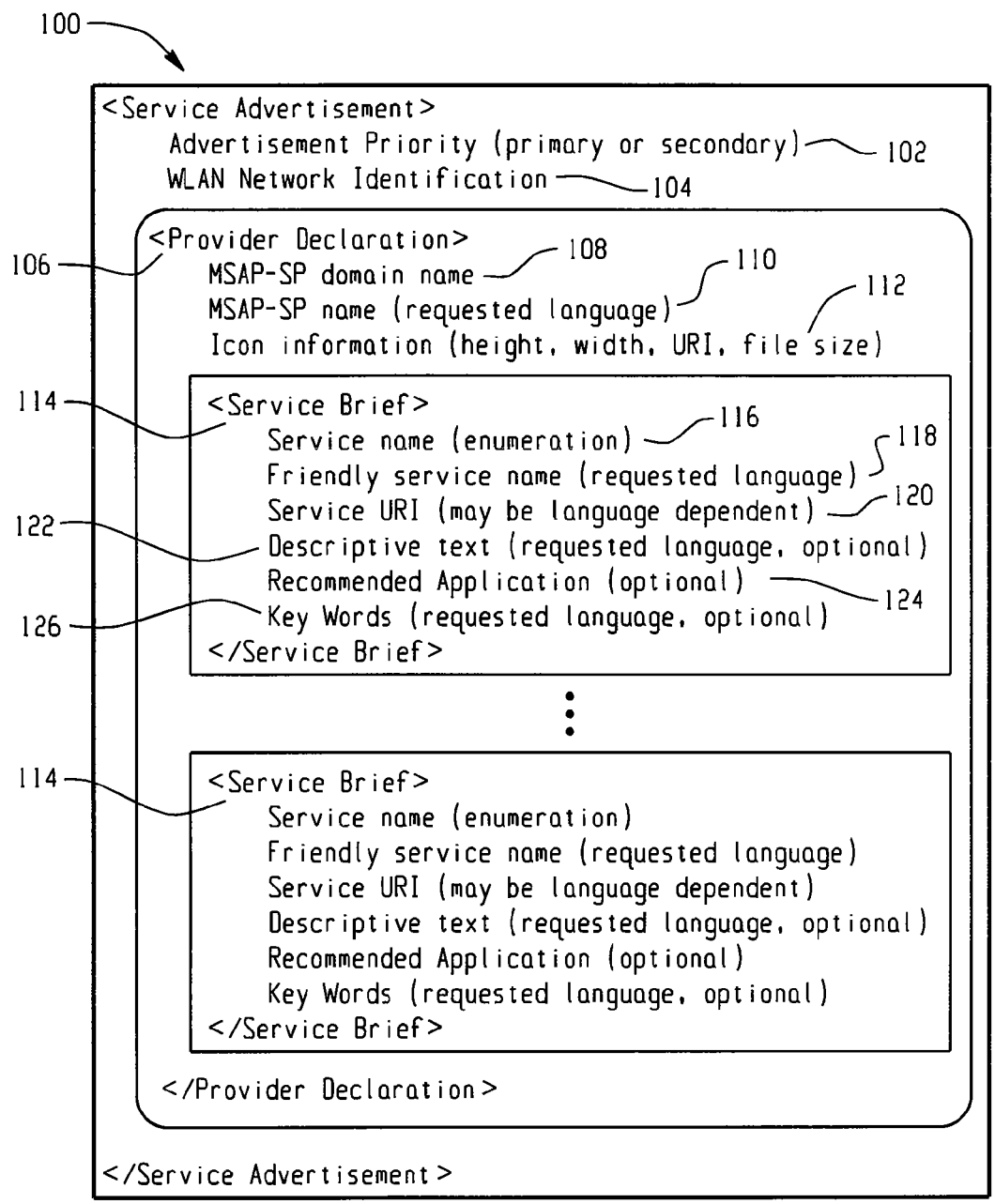
FIG. 1 illustrates an example of a service advertisement.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment described herein, there is disclosed an apparatus comprising a transceiver configured to send and receive data and a controller coupled to the transceiver. The controller is configured to determine from a signal received by the transceiver whether a device sending the signal supports a protocol for advertising available services from the associated device. The controller is configured to send a request for available services from the associated device via the transceiver responsive to determining the associated device supports the protocol. The controller is configured to receive a response to the request via the transceiver, the response comprising a signature. The response comprises state information, at least one service advertisement that comprises at least one service brief, and the controller is configured to validate the response by confirming the signature includes the state information, information to bind the response to the request, and at least one service advertisement.

In accordance with an example embodiment, there is disclosed herein an apparatus comprising an interface configured to send and receive data and logic coupled to the interface. The logic is configured to receive a request from the transceiver for data representative of services provided. The logic is configured to generate a response to the request, the response comprising data representative of a provider declaration, data representative of a network identifier, and a signature cryptographically binding the data representative of the provider declaration and data representative of the network identifier. The logic is further configured to send the response to via the transceiver.

In accordance with an example embodiment, there is disclosed herein an a method comprising receiving a signal from an access network provider, and determining from the signal whether the access network provider supports a protocol for advertising available services. A request is sent for a list of available services from the access network provider. The request may contain a nonce to uniquely identify the request. A hash of the request is generated. A response to the request is received, the response comprising a signature. The response is validated. Validating the response comprises determining that the response has a request hash matching the generated hash, and determining the signature includes the request hash.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is described herein a Mobility Services Advertisement Protocol (MSAP) where pre-association service advertisements are delivered to a mobile device when the device is within radio range of an Access Point (AP). When a mobile device is not associated to an AP (e.g., pre-association), there is no link security between the AP and the mobile. Therefore, unless high-layer security methods are employed, messages exchanged between the AP and mobile device are subject to attacks which might not be detected. For example, an MSAP query or response could be tampered with by an attacker with the result that the user associated with the mobile device could receive false or harmful (if acted upon) information. Service advertisements are then displayed on a user interface (UI) on the mobile device.

A mobile device posts an MSAP query to the MSAP server to request service advertisements. If the mobile device uses a secure protocol to query the MSAP Server, (e.g., HTTPS), then the MSAP Response is protected by that secure protocol; otherwise, the MSAP Server provides a digitally-signed response using the private key of the MSAP Server certificate. A mobile device validates the signature to ensure an attacker has not tampered with the MSAP Server's response. Each MSAP Response is composed of a request nonce, a cookie, a request hash, the MSAP Server's certification information, a list of service advertisements and a digital signature.

When a mobile device posts an MSAP query using an insecure protocol (e.g., 802.11u GAS—Generic Advertisement Service), it includes a request nonce. A nonce is a long, random number (e.g., at least 128 bits). The digital signature is computed over the entire MSAP response, which includes this nonce hashed with the rest of the query; because of this, the digital signature proves the MSAP Server possesses the private key of its server certificate and is in response to the original query (e.g., that it's not simply replaying an MSAP Response from another source in an attempt to spoof the MSAP client in the mobile device).

In an example embodiment, when a mobile device wishes to engage in an MSAP exchange, it first obtains a cookie from the MSAP Server. This cookie is used in all subsequent MSAP message exchanges. The purpose of the cookie is to help mitigate potential DoS attacks against the MSAP Server. One purpose of the cookie is to help ensure the requesting MSAP client is legitimate and not a rogue device. It ensures the MSAP client can at least process an exchange properly; otherwise it wouldn't be able to obtain a cookie. Since the MSAP Server predicates further processing on the reception of a valid cookie, it will only perform the more computationally complex processing (e.g., digital signatures) for legitimate requests.

In an example embodiment, the cookie is used to keep state information on the mobile device. This makes the MSAP server much more scalable since it doesn't have to keep state itself for the plurality of mobile devices engaged in MSAP message exchanges. In another example embodiment, the cookie includes whether a particular client as identified by its MAC address, has received the primary service advertisements (described herein infra); in this example embodiment, the MSAP server won't provide the secondary service advertisements until the mobile device has first received the primary service advertisements.

In yet another example embodiment, a centralized MSAP Server provides service advertisements for a multiplicity of different venues (e.g., location-based services). In this embodiment, the cookie keeps track of the venue from which the mobile device is making the request.

Before a mobile device posts an MSAP query using an insecure protocol (e.g., 802.11u GAS—Generic Advertisement Service), it computes a hash of its query. The mobile device temporarily saves the request hash and does not include the hash in the query. The MSAP Server, upon receiving the mobile's query, computes the request hash and includes this hash in its response. Upon receiving the MSAP response, the mobile device compares its saved request hash with the one in the MSAP response. If the values are identical, then the mobile device knows its request was not tampered with prior to reception by the MSAP Server. The mobile device also knows the MSAP Server's response was not tampered with by an attacker by verifying the digital signature as described above. MSAP Server certificate information is provided to the mobile device so it has the information needed to retrieve the digital certificates from the network so it can validate MSAP responses.

In an example embodiment, the mobile device enables an end-user associated with a mobile to select an icon on the user interface (UI) of the client device to obtain additional data about available services from the service advertiser. For example, the user may tap an icon on a touch-screen display where in response to the tap the mobile device sends a request to the MSAP server to pull information describing available services (referred to herein as a service advertisement) from the service advertiser to the mobile device. Each service advertisement comprises a provider declaration and a wireless network identifier. This enables a mobile device receiving a service advertisement to determine on which WLAN the services offered by any particular provider are reachable.

The provider declaration comprises the provider's name plus at least one service brief. This gives service provider the flexibility to have a single icon associated with a single service or a single icon to be associated with a set of related services. For example, referring to FIG. 1, there is illustrated an example of a service advertisement 100 with a Provider Declaration 106. In this example, Service advertisement 100 comprises an advertisement priority 102, wireless local area network (WLAN) Identification 104, and a Provider Declaration 106.

Provider Declaration 106 comprises a MSAP-SP domain name 108, MSAP-SP name (in the requestor's language) 110, Icon information (e.g. height, width, URI, file size, etc.) 112, and Service Briefs 114. In the illustrated example there are two service briefs 114; however, those skilled in the art should readily appreciate that Provider declaration 106 may have only one Service Brief or as many Service Briefs as are physically realizable.

Service Briefs 114 comprise a Service name 116, Friendly service name (in the requested language) 118, and Service URI 120. Optionally Service Briefs 114 may suitably comprise Descriptive Text (in the requested language) 122, Recommended Application (or Applications) 124, and/or keywords 126 (which may be in the requestor's language. Note that the Recommended Application 124 may be OS (operating system) specific. Keywords 126 may be provided to enable a user to quickly locate services.

In an example embodiment, the provider declaration gives the provider name both as an (Request for Comments) RFC-1035 domain name and a "friendly" name (for example a free form text in the language of the mobile device's user). The provider declaration also references an icon URI which can be used to associated the provider's icon with the associated domain name; alternatively, a logotype certificate (RFC-3709) which can be used to securely associate the provider's icon (typically in the form of a Uniform Resource Identifier "URI" reference) with the associated domain name and a public/private key pair. This certificate may be used with the mechanisms described in U.S. Patent Application Publication No. 2012/0054848 when the service advertiser is not completely trusted. If a logotype certificate is employed, the private key is then used to sign the entire provider declaration with an enveloping XML digital signature. This provides the mobile device a means to detect whether the provider declaration has been tampered with by an attacker. If a logotype certificate is not used, then the private key of the MSAP Server is used, as described above, to digitally sign the MSAP response. The private key of the MSAP server is used as described above to digitally sign the MSAP server response with an enveloping XML Digital Signature.

In an example embodiment, there are two types of service advertisements, primary and secondary. Primary service advertisements may be related to basic services provided for a venue, for example a floor plan of a mall, link to network help desk, secure online credential signup, or a service that most users would be interested in such as a coupon for free coffee. Primary service advertisements are always provided to mobile devices. Secondary service advertisements are used for all other service advertisements. There can be any number of secondary service advertisements for a venue. For example a large shopping mall may have a large number of service advertisements. In particular embodiments, queries for specific service advertisements can be generated. For example, queries can be employed to return service advertisements that match a specified parameter such as service name (selected from an enumerated list), provider domain name, and/or service advertisements with matching keywords.

Figure 2:
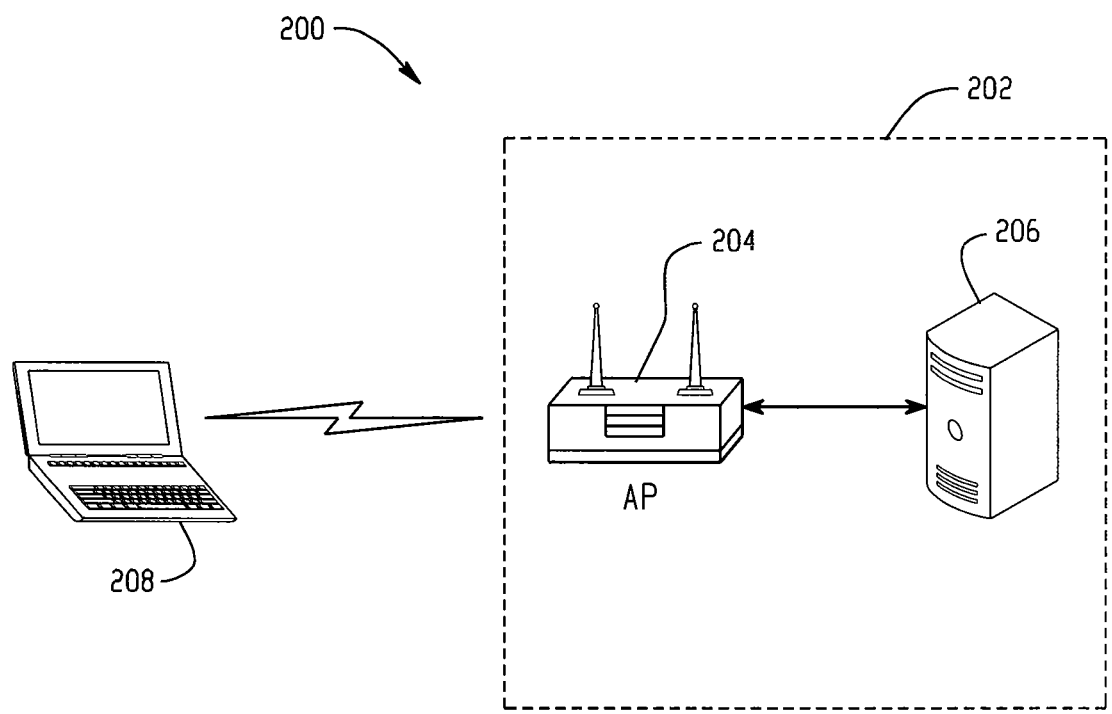
FIG. 2 illustrates an example of a wireless local area network with a service provider configured in accordance with an example embodiment.

FIG. 2 illustrates an example of a wireless local area network 200 configured in accordance with an example embodiment. Network 200 comprises a service provider network 202 and a mobile device 208 in wireless communication with service provider network 202. Service provider network 202 comprises an access point (AP) 204 and a Mobile Service Advertisement Protocol (MSAP) compatible server 206 coupled to AP 204. As used herein, MSAP is a protocol that manages services offered by the higher layers (in the OSI model) that are to be advertised by the network edge (in this example AP 204). The Institute of Electrical and Electronics Engineers is currently promulgating a standard, IEEE 802.11u (draft April 2020, which network 200 may employ in an example embodiment. Note that although the description herein describes mobile device 208 in wireless communication with access point 204, those skilled in the art should readily appreciate the communication link between mobile device 208 and access point 204 may be a wired link, or a combination of wireless and wired communication link.

In an example embodiment, AP 204 sends signals, such as beacons and probe responses, advertising that it supports an advertisement protocol (e.g., MSAP) for advertising available services from network 202 accessible through AP 204. Mobile device 208 receives the beacons (or probe response) and can determine that AP 204 supports an advertisement protocol. In response, mobile device 208 can send a request for services (for example in a "GAS", IEEE 802.11u Generic Advertisement Service, request) to AP 204. AP 204 forwards the request to MSAP server 206.

Figure 6:
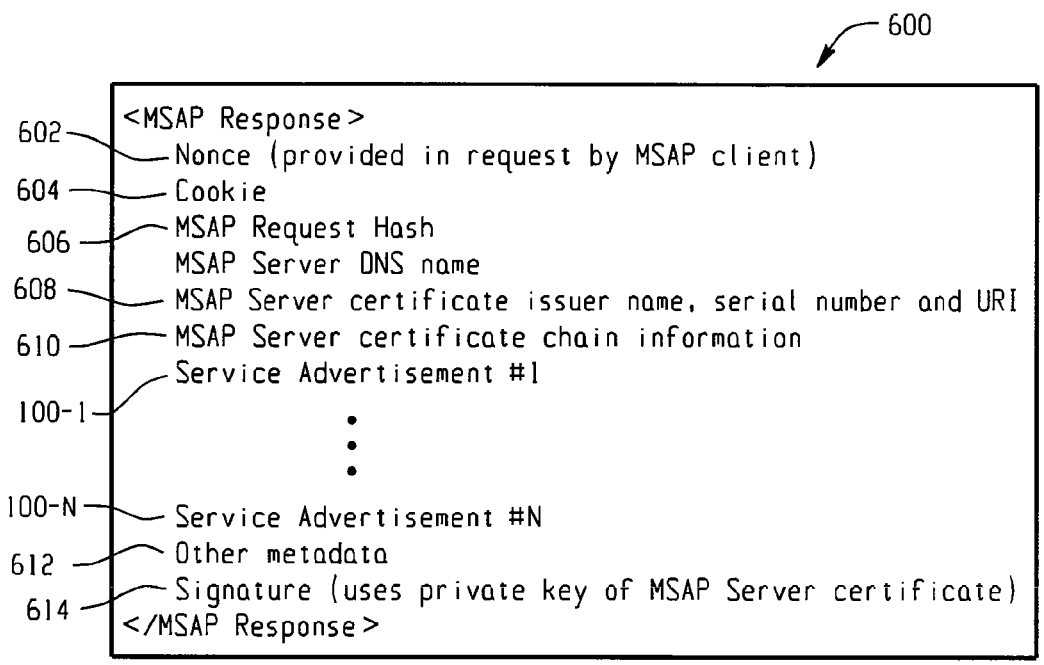
FIG. 6 illustrates an example of a response to a Get Advertisement Service query.

MSAP server 206 generates a response to the request. An example of the response is illustrated in FIG. 6. The response comprises a nonce, cookie, request hash, the MSAP Server's DNS name, the MSAP Server's certificate information, one or more service advertisements, other metadata as needed and a signature that cryptographically ensures that this data is not tampered with by an attacker. Mobile device 208 receives the response and validates the response by confirming the signature using a pre-established key.

In an example embodiment, wherein the request for available services comprises a nonce. Mobile device 208 is further configured to validate the response by verifying the signature includes the same nonce within the request hash.

In an example embodiment, the provider declaration comprises a provider declaration and at least one service brief. The provider declaration comprises an identifier for a provider of the service. The identifier may suitably comprise a domain name and textual data representative of the provider. The identifier may also include graphic or audio data used to identify the provider. In particular embodiments, the provider declaration comprises a certificate associating an icon for the provider, textual data representative of the provider, and a key pair.

In an example embodiment, the service brief comprises a service name. The service brief may suitably comprise textual data representative of a service. In particular embodiments the service brief comprises data representative of an application for obtaining a service. The service brief may also comprise data representative of keywords associated with a service.

In an example embodiment, the response the service advertisement comprises a provider declaration, and the signature is an enveloping Extensible Mark-up Language (XML) digital signature. Mobile device 208 may employ a public key to validate the signature by verifying the signature which means that the private key corresponding to the public key was employed to generate that signature.

In an example embodiment, mobile device 208 comprises a user interface. Mobile device 208 is configured to provide data representative of the service on the user interface responsive to validate the response. For example, the data representative of the service provided on the user interface may suitably comprise an icon. Mobile device 208 is configured to determine whether an input was received on the user interface indicating the icon was selected. Mobile device 208 is further configured to associate with a network identified by the network identifier responsive to determining the icon was selected.

In an example embodiment, the network data comprises a basic service set identifier (BSSID). In another example embodiment, the network data comprises a service set identifier (SSID) corresponding to an advertised service. In still another example embodiment, the network data comprises a plurality of service set identifiers (SSIDs) corresponding to a plurality of advertised services. In yet still another example embodiment, the network data comprises a homogeneous extended service set identifier HESSID as defined in IEEE 802.11u). Other example embodiments include combinations of the aforementioned data.

In an example embodiment, the Provider Declaration is the actual advertisement from the entity for which the user is requesting a service. The Provider Declaration comprises the following data:

MSAP Service Provider name (referred to as the MSAP-SP)
MSAP-SP icon
Service name and free-form text describing the service
The URI at which the service can be obtained
Service Icon certificate URI and ancillary information (e.g., metadata)
Digital signature In an example embodiment, the provider declaration is signed by the private key corresponding to the public key from the Service Icon certificate, which is owned by the MSAP-SP. This authenticates that the MSAP service provider name, icon, service name and free-form text and URI (Uniform Resource Indicator) are all owned by the MSAP-SP, are legitimate and intended to be bound together. It may be particularly desirable that the provider declaration is validated since only the icon might be displayed on the mobile device's UI (User Interface). In this case, the icon is selected (e.g., "clicked") by a user to request the corresponding service and the user would be making the selection based solely on the branding displayed in the icon. In other words, the user might not see the URI which is being "clicked". Thus, proper validation of a provider declaration protects the user from security attacks such as phishing attacks and identity theft.

In an example embodiment, icons and certificates are not part of the provider declaration per se. The certificates are not part of the provider declaration for the same reason that the MSAP Server certificate is not part of the service advertisement. The icon itself is not part of the provider declaration per se because icons are relatively large files to be transferring pre-association. In addition, mobile devices are expected to have an icon cache. However, icons can be retrieved from the MSAP Server. The same is true for other large pieces of binary information.

Figure 3A:
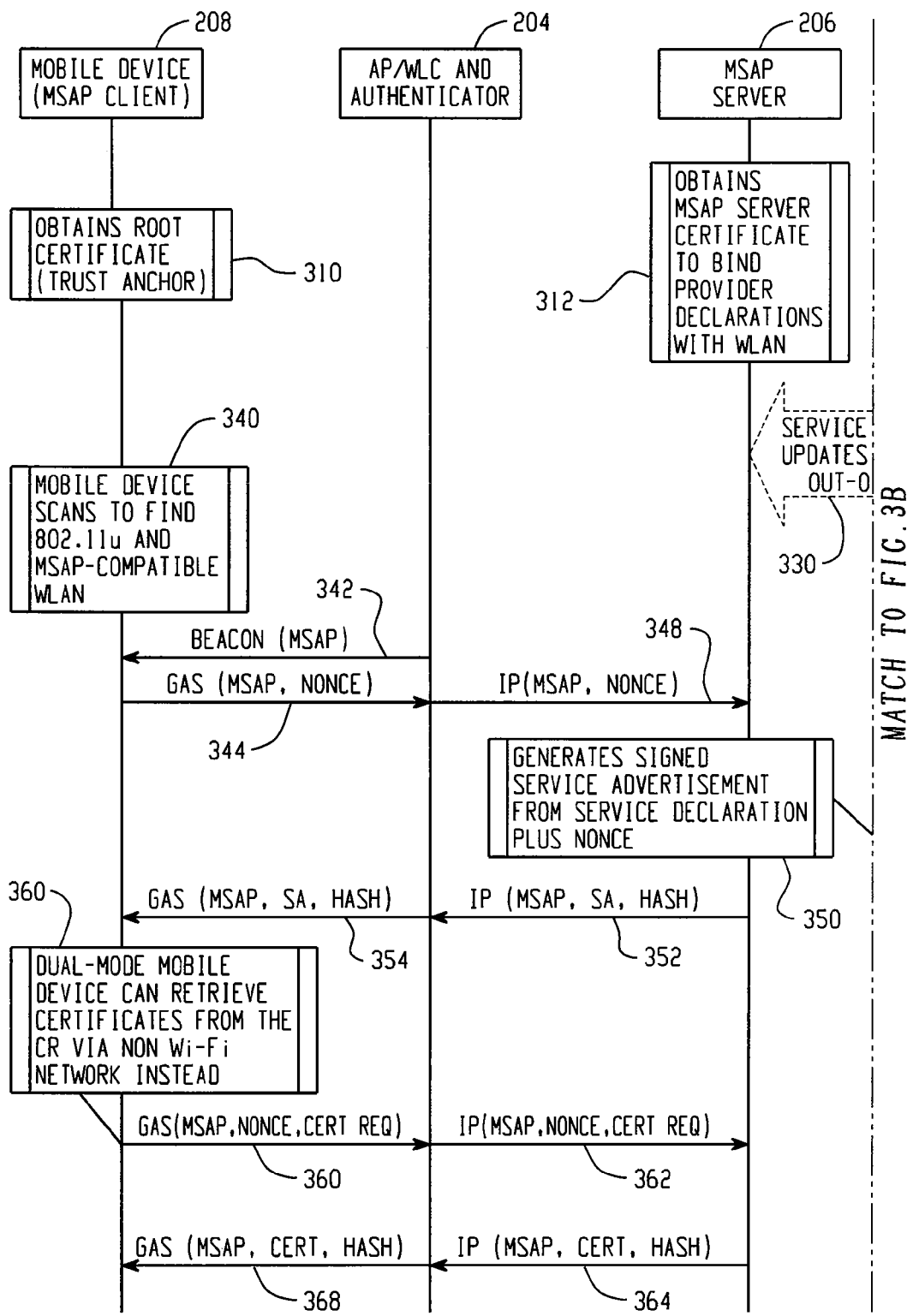
FIGS. 3-5 illustrate an example signal diagram for enabling a wireless mobile unit to receive advertising services from a wireless local area network.
Figure 3B:
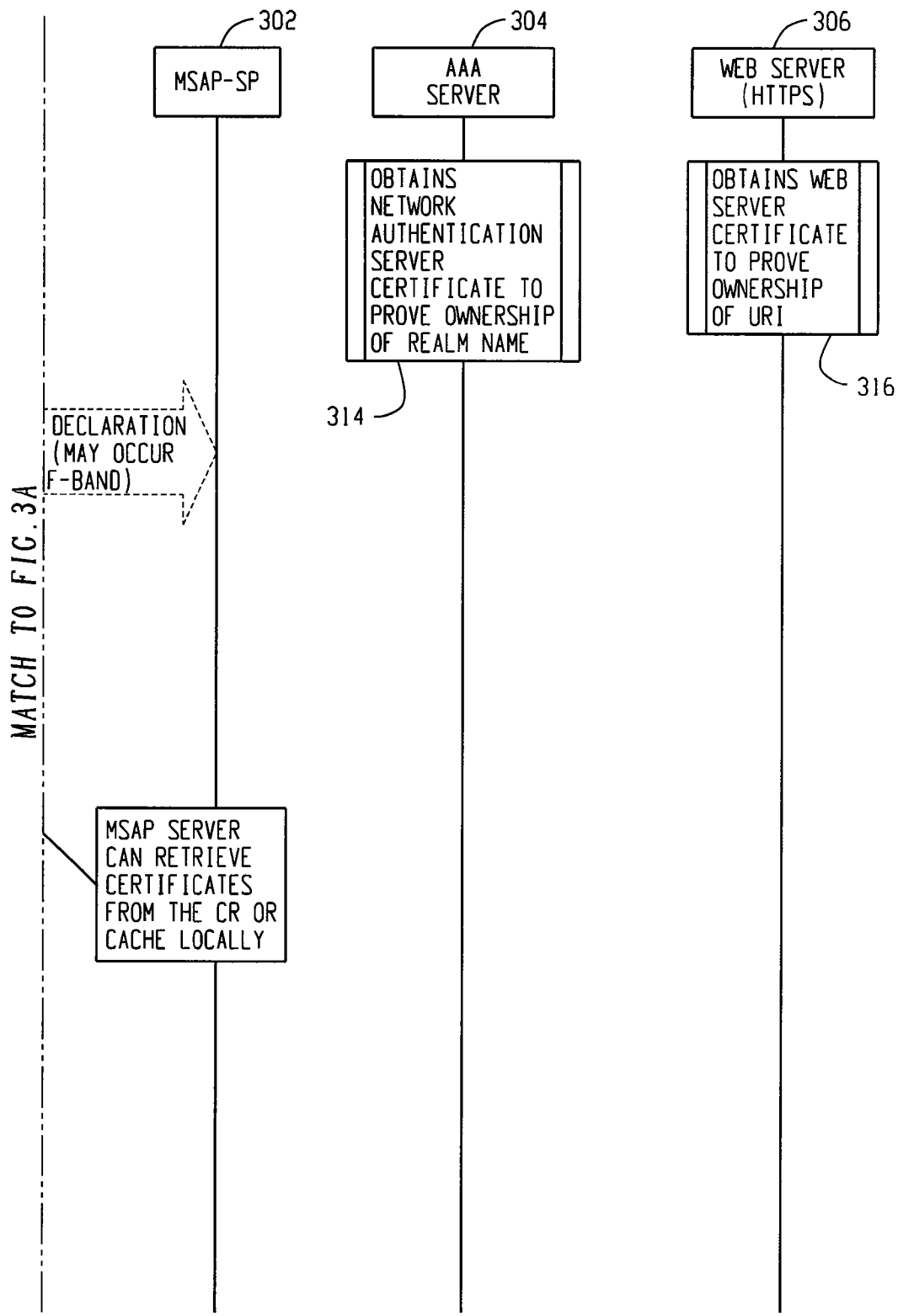
Figure 4A:
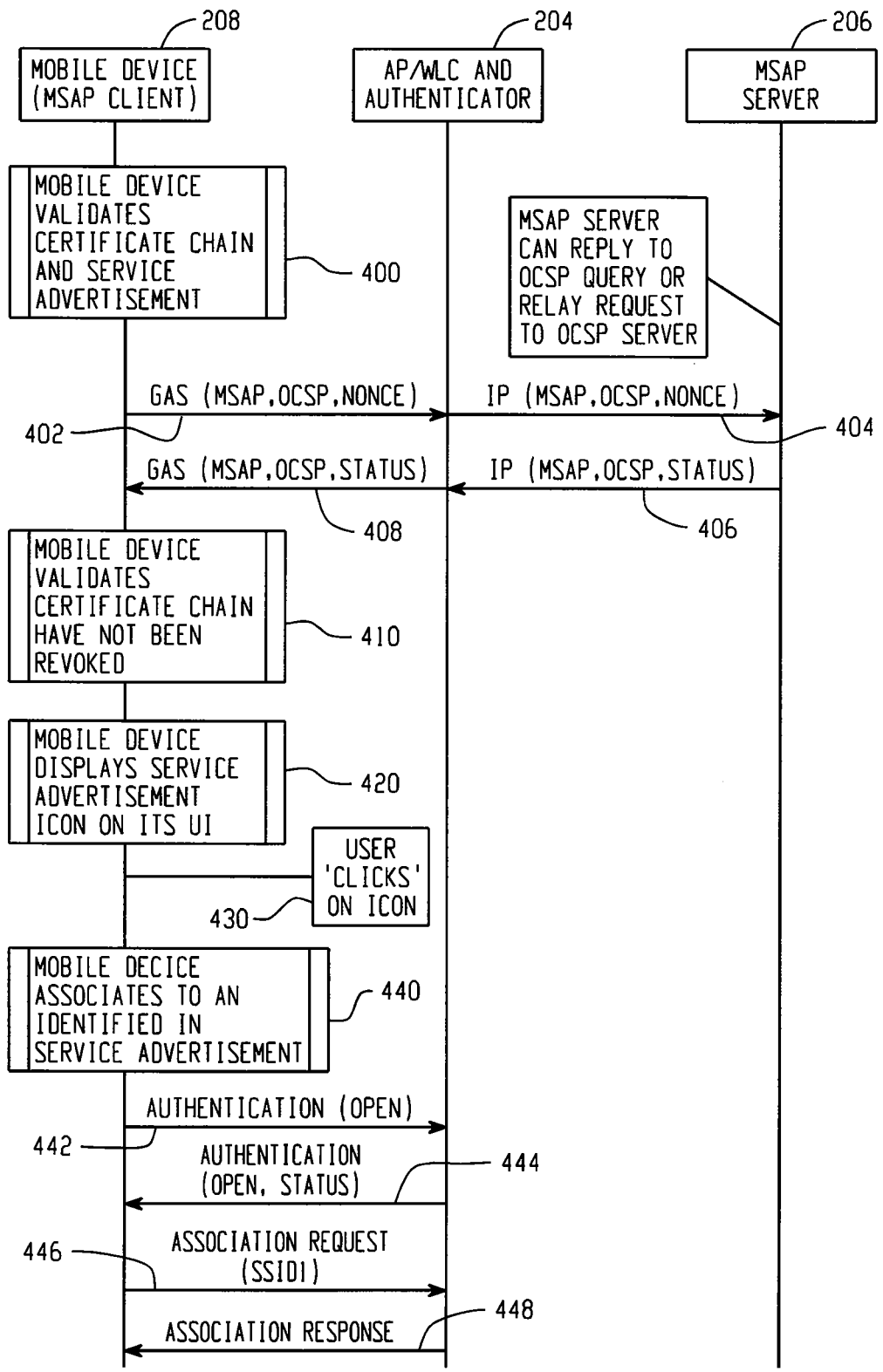
Figure 4B:
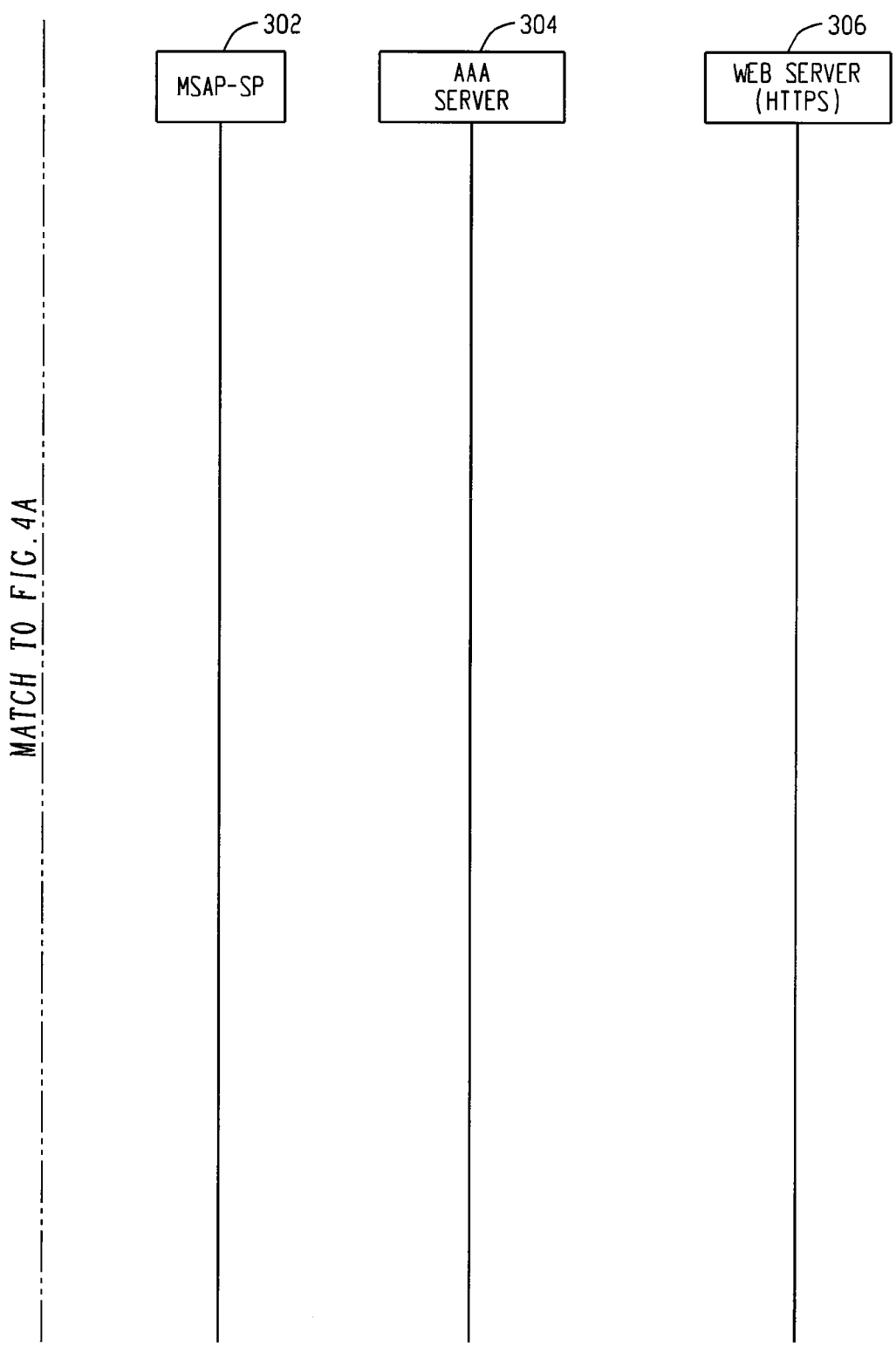
Figure 5A:
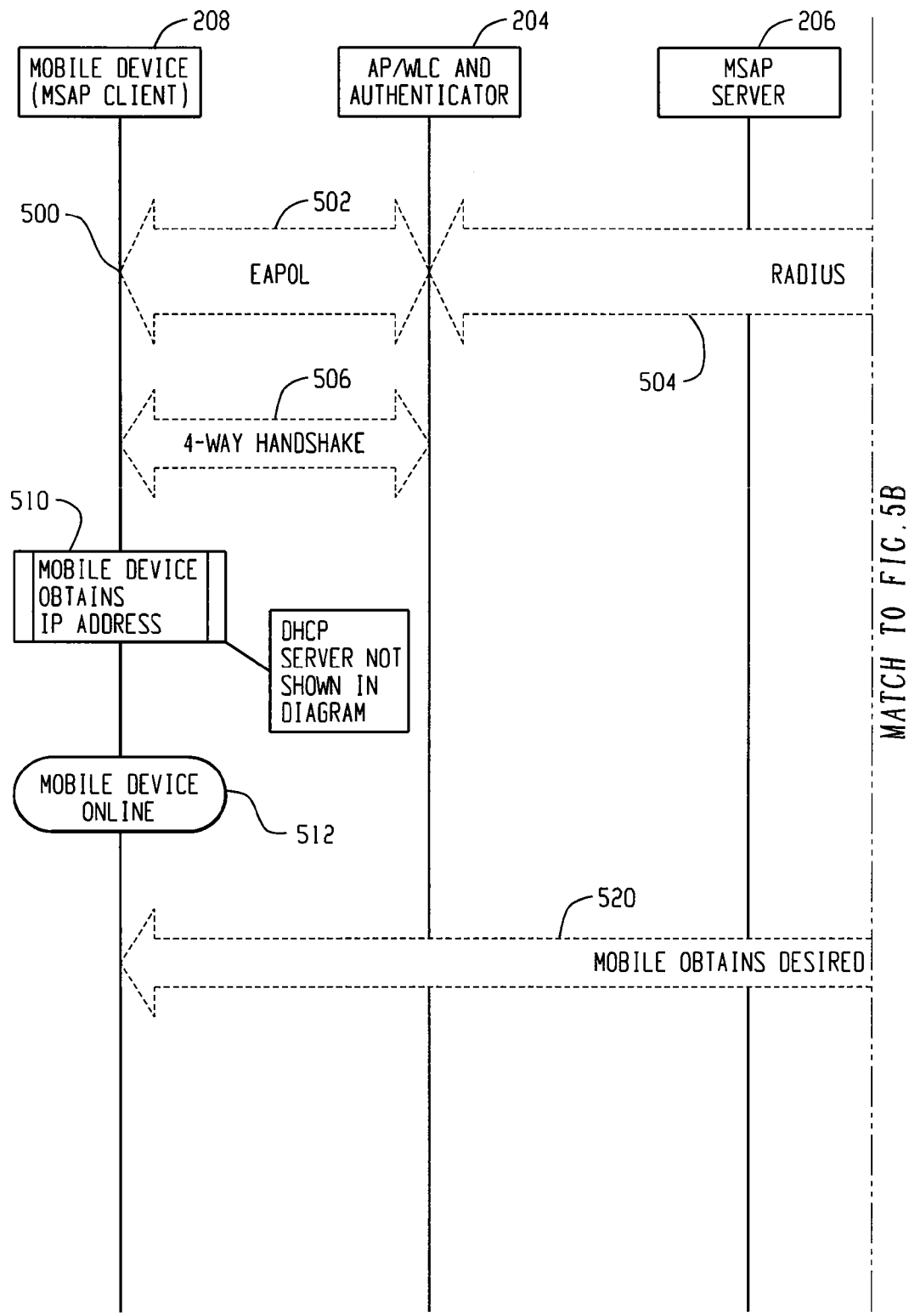
Figure 5B:
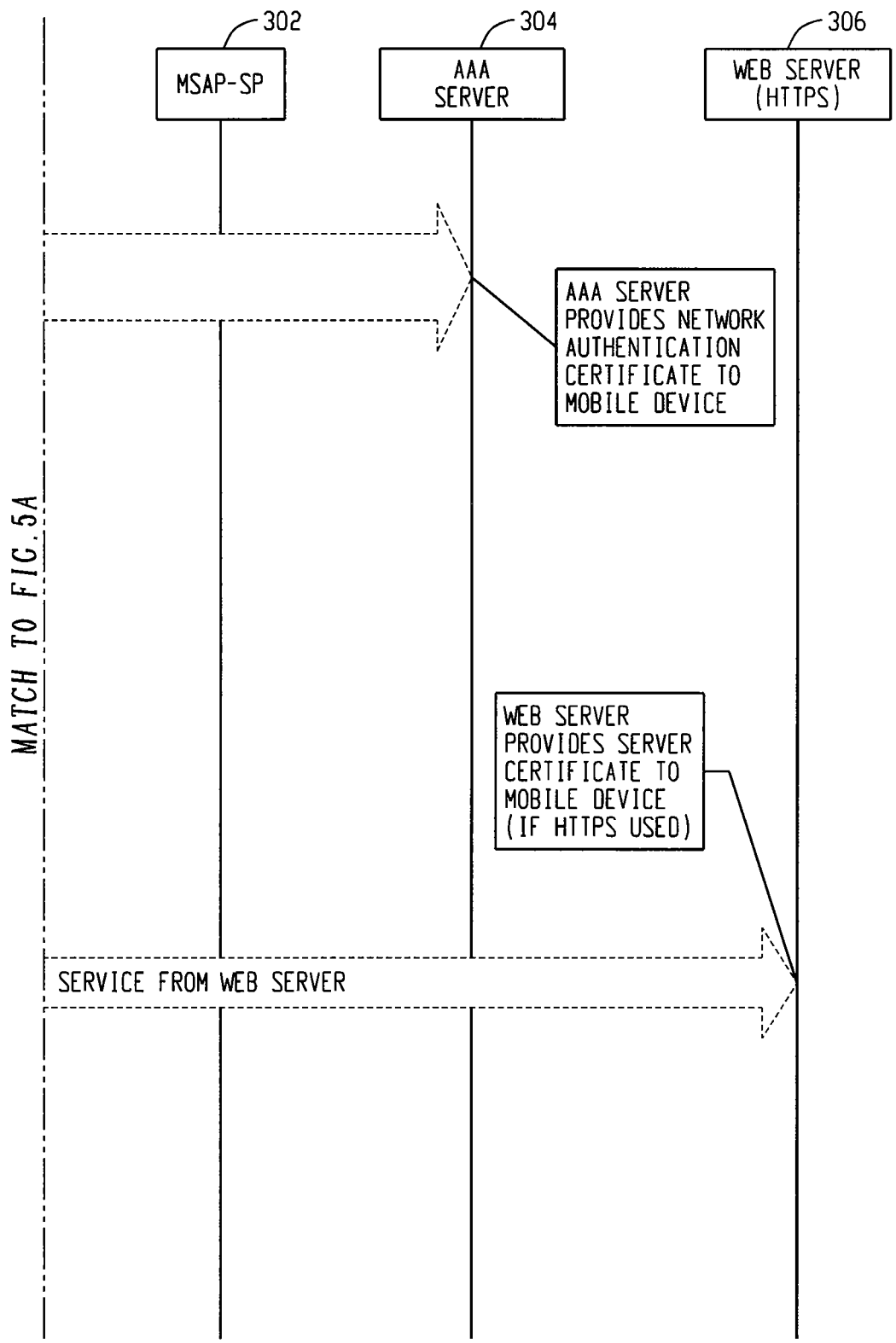

The sequence of events for online sign-up service is summarized in FIGS. 3-5. In an example embodiment, the components that are involved in implementing the process comprise a mobile device (MSAP client) 208, APNVLC (wireless LAN controller) & Authenticator 204, MAP Server 206, MSAP-SP 302, AAA (Authentication Authorization and Accounting) Server 304 and Web Server (which for purposes of illustration in this example supports the Hypertext Transfer Protocol Secure "HTTPS" protocol although any suitable secure protocol may be employed) 306. Beginning with FIG. 3, the pre-requisites for online signup are shown at 310, 312, 314, and 316. At 310, mobile device 108 is provided with a root trust anchor for a Public Key Infrastructure (PKI) hierarchy which is used to validate all the other certificates used in the service advertisement solution.

At 312, the ANP (Access Network Provider, which is the entity responsible for administering MSAP Server 106 in this example) is provided with a MSAP Server certificate. The MSAP Server certificate is used to bind provider declarations with the WLAN. At 314, AAA server 304 obtains a Network Authentication Server certificate to prove ownership of the realm name.

At 316, Web Server 306 obtains a Web Server certificate. This certificate is used to by Web Server 306 to authenticate that it is the server or belongs to the domain indicated by the URI in the provider declaration. Note that this certificate already exists for many web servers; in these cases, the service advertisement solution uses the certificate without modification.

To make use of the service advertisement solution, mobile device 208 scans for Wi-Fi networks as illustrated at 340. When mobile device 208 is within radio range of a hotspot (such as AP 204), it receives the hotspot's beacon frames as illustrated at 342. If the beacon frame advertises support for an advertising protocol such as MSAP, mobile device 208 may use a Generic Advertisement Service (GAS) request to retrieve service advertisements. Mobile device 208 may be configured with a policy to decide whether to retrieve service advertisements as well as to decide whether or not to associate to any given Wi-Fi network.

In an example embodiment, to retrieve a service advertisement, mobile device 208 uses GAS to transmit an MSAP query 344, which in particular embodiments includes a Nonce, to MSAP Server 206 via the hotspot's AP 204. In an example embodiment, mobile device 208 creates a hash of the request. If the request included a Nonce, the Nonce is included in the Hash. The hash in the request is not sent with the response.

AP 204 (in this example includes a Wireless LAN Controller or WLC which those skilled in the art can readily appreciate may be a separate infrastructure node on the network) forwards the request to MSAP server 206, which in this example the MSAP request is encapsulated in an Internet Protocol (IP) frame, IP (MSAP, Nonce) 348.

At 350, MSAP Server 206 generates a response that includes the service advertisement and a hash of the service advertisement request sent by mobile device 208, and if the request included a nonce, the hash would also include the Nonce. In an example embodiment, the Nonce is used to prove liveness. In particular embodiments, the response may also include state information, for example a cookie. MSAP server 206 digitally signs the response with its private key. The response is encapsulated into an IP datagram, IP (MSAP, SA, hash) 352, that is sent to AP 204. AP 204 removes the IP encapsulation header and sends the response as GAS (MSAP, SA, hash) 354 to mobile device 208. An example of a response sent by MSAP server 208 is illustrated in FIG. 6 that will be described in more detail herein infra. In an example embodiment, Mobile device 204 verifies the hash in the response with the request hash.

If mobile device 208 needs one or more certificates in the certificate hierarchy, it may request them from MSAP Server 208 by sending a certificate request (Cert. Req.). In an example embodiment, the certificate request is sent via a second wireless protocol. For example if mobile device 208 is communicating with MSAP Server 206 using WiFi, the certificate request may be sent using a cellular network.

In the example illustrated in FIG. 3, the certificate request sent by mobile device 208 is illustrated by GAS (MSAP, Nonce, Cert Req.) 360 sent from mobile device 208 to AP 204, which is forwarded by AP 204 as an internet protocol (IP) frame to MSAP Server 206, IP (MSAP, Nonce, Cert. Req.) 362. MSAP Server 206 generates a response, a signed certificate plus the Nonce as illustrated by 365. The response from MSAP Server 206 is IP (MSAP, Cert., hash) 366 is sent to AP 204. AP 204 removes the IP encapsulation header and forwards to mobile device 208 as illustrated by GAS (MSAP, Cert., hash) 368.

Referring now to FIG. 4, mobile device 208 validates the certificate chain, service advertisement and provider declaration as illustrated by 400. For example, mobile device 208 may determine (using a public key for MSAP Server 206) whether the XML digital signature in the MSAP response matches the XML digital signature computed by the mobile device.

In the illustrated example, mobile device 208 sends a GAS (MSAP-OCSP, Nonce) message 402 to AP 204. The use of OCSP is optional. In particular embodiments, the message 402 may include state information (e.g., a cookie). AP 208 routes the message to MSAP server 206 via IP (MSAP-OCSP, Nonce) message 404. MSAP server 206 generates a response that is sent to AP 204 in IPMSAP-OCSP, Status) message 406. AP 204 removes the IP encapsulation and forwards the message to mobile device 208 in GAS (MSAP-OCSP, Status) message 408.

At 410, mobile device 208 verifies the certificates received in the service advertisement have not been revoked. Mobile device 208 may use any suitable protocol, such as uses Online Certificate Status Protocol "OCSP" (RFC 2560) to verify the certificates haven't be revoked. If the entire service advertisement validation process is successful, then the mobile device displays the icon on its UI as illustrated by 420.

At 430, the user selects (e.g., "clicks") on the displayed icon. In response, at 440 mobile device 208 associates to the Wi-Fi network identified in the service advertisement. This is illustrated by Authentication (open) 442, Authentication (open, status) 444, Association Request (SSID1) 446, and Association Response 448. In particular embodiments, mobile device 208 may display the icon without validating the response message 354, or certificates until after the icon is selected. For example, mobile device 208 may send message 360 and/or message messages 402 after the icon is selected. If the response message 354, response to message 360, and/or response to message 402 are invalid, mobile device may output an error message.

Referring now to FIG. 5 with continued reference to FIGS. 3 and 4, after successful association, the Authenticator will initiate an Extensible Authentication Protocol (EAP) request as illustrated at 500. Mobile device provides the NAI (i.e., guest credential) received in the provider declaration in the outer EAP-Identity response using EAPOL (EAPOver LAN) as illustrated by 502. Upon receipt of the EAPOL identity, the Authenticator (AP) 204 routes the EAP frames to AAA Server 304 which is identified by the realm as illustrated by 504. During EAP-FAST, AAA server 302 will provide its AS (Authentication Server) certificate to mobile device 208, proving it owns the realm. The Mobile Device may check to make sure that the information in the AS certificate is consistent with the information included in the advertisement.

Upon receiving authentication request, AAA Server 302 will respond to the Authenticator (AP 204) with keying material. AP 304 and mobile device 208 proceed to a 4-way handshake, thereby establishing a Layer 2 security association as illustrated by 506.

If needed, mobile device 208 obtains an IP address at 510. Mobile device 208 may obtain the IP address from a Dynamic Host Configuration Protocol (DHCP) Server (not shown). In an example embodiment, mobile device 208 launches an application (for example a browser) to the URI obtained from the provider declaration at 520 and obtains the desired service from web server 306. The Mobile Device may authenticate the connection to the URI and verify that the information authenticated during the connection establishment is consistent with the information included in the advertisement.

FIG. 6 illustrates an example response 600 to a Get Advertisement Service query, e.g., a MSAP response. For example, a response similar to response 600 may be returned to mobile device 208 in message 354. Note that in at least one example embodiment, not all of the data listed in FIG. 6 may be returned in a response.

In the illustrated example, response 600 includes a Nonce 602 that was provided in the request by the requesting client (for example mobile device 208 in FIGS. 3-5); however, the Nonce may be part of the request hash. The requesting client (for example mobile device 208 in FIGS. 3-5) can verify the Nonce is correct to prove liveness of the response. Response 600 also includes state information 604 that may be provided in a cookie. A cookie may be employed by a MSAP server to prevent denial of service attacks. Response 600 further comprises a MSAP Request Hash (a hash of the request) 606. Response 600 further comprises a MSAP Server Domain Name Service (DNS) name 606, MSAP Server Certificate (which may include for example the certificate issuer name, serial number and URI) 608, MSAP Server certificate chain information 610, Service Advertisements 100-1 through 100-N (see for example FIG. 1 for an example of a Service Advertisement). The number of service advertisements may be as few as one or as many as can be physically realized (for example N can be any physically realizable integer greater than one). In particular embodiments, response 600 may include other metadata (for example any other data the service provider may wish to provide) 612. Signature 614 is generated by the responding server (such as Server 302 in FIG. 3) using the server's private key, which the requesting device (e.g., mobile device 208 in FIG. 3) can validate using the server's public key. The signature may include any combination of the data (such as cookie 602, MSAP Server Request Hash 604, MSAP Server DNS Name 606, MSAP Server certificate 608, MSAP Server certificate chain information 610, Service advertisements 100-1 through 100-N, and other metadata 612). In an example embodiment, the Public Key corresponding to the Private Key used to generate signature 614 is bound to a name through a signature by a trusted Certificate Authority (CA). Thus, the requestor (for example mobile device 208 in FIG. 3) can validate response 600 by verifying Nonce 602, MSAP Request Hash 604, Signature 614, or any combination of Nonce 602, MSAP Request Hash 604, and Signature 604 are correct.

Figure 7:
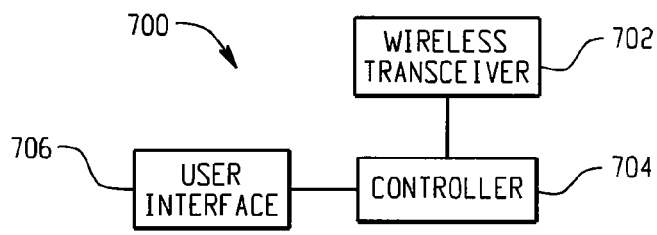
FIG. 7 is a block diagram of a mobile device upon which an example embodiment may be implemented.

FIG. 7 is a block diagram of a mobile device 700 upon which an example embodiment may be implemented. Mobile device 700 is suitable to implement the functionality of mobile device 208 (FIGS. 2-5). Mobile device 702 comprises a wireless transceiver 702 which is configured to send and receive wireless signals. Controller 704, coupled to wireless transceiver 702, is configured to send and receive data via wireless transceiver 702. Controller 704 may can be configured to implement the functionality described herein with reference to mobile device 108 (FIGS. 2-5) and may further employ logic for implanting the described functionality. For example, mobile device 700 can receive signals (for example passively receive beacons or actively by sending probe signals and waiting for responses to the probe signals) via wireless transceiver 702. Controller 704 can determine from the beacons whether the source of the beacon supports a network advertising protocol such as MSAP or a protocol compatible with the proposed 802.11u protocol. Controller 704 may also use data representative of available services to aid in selecting a connection to a network as well (for example which AP and with which SSID). Controller 704 can then send a signal via wireless transceiver 702 to request available services. Controller 704 may also generate a nonce to include in the signal sent via wireless transceiver 702. A response to the request can be received via wireless transceiver 702. Controller 704 can authenticate the response by employing any suitable technique, such as those described herein. For example, controller 704 can determine whether the response contains a signature that includes a Nonce, a hash of the request, a server DNS name, server certificate issuer name, server certificate serial number, server certificate URI, server certificate chain information, at least one service advertisement, other metadata, or any combination thereof. In particular embodiments, controller 704 is configured with a public key corresponding to an advertising server (such as a MSAP server). In particular embodiments, controller 704 may select a connection to a network based on data acquired from the Service Advertisement process (see e.g., FIGS. 2-5). For example, controller 704 may determine whether to stay with an AP using a designated SSID or move to a different AP (and even a different network).

In an example embodiment, apparatus 700 further comprises a user interface 706 that enables controller 704 to output information about available services. For example, user interface may suitably comprise a video output capable of outputting an icon and/or textual description, and/or an audio output for outputting an audio signal, or combination audio and visual outputs. In particular embodiments, user interface 706 comprises a touch screen interface, and data (for example an icon) is displayed on the touch screen which enables a user to select the service by touching an area of the display associated with the data (e.g. Icon) for the desired service. In an example embodiment, controller 704 validates the response before outputting information about available services. If the response cannot be validated, no information is displayed. In another example embodiment, controller 704 outputs information without validating the response; however, upon selection of a service, the response is validated, and if the response cannot be validated, an output is generated to inform a user the service could be not be validated.

Figures 8, 9:
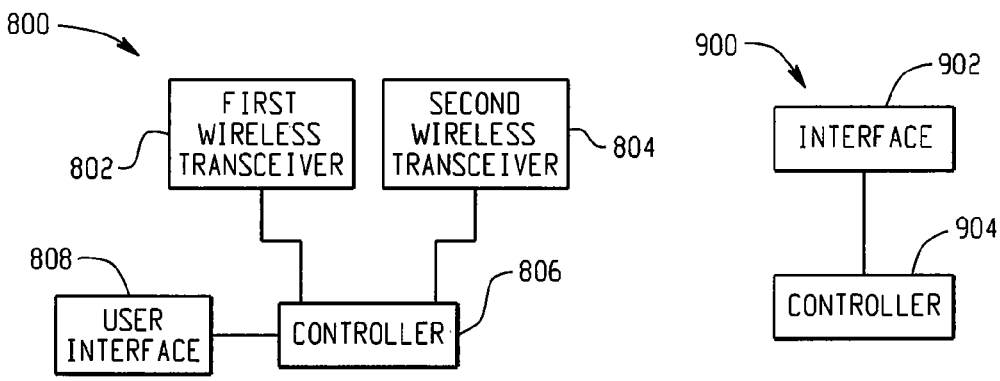
FIG. 8 is a block diagram of a mobile device with multiple transceivers upon which an example embodiment may be implemented.
FIG. 9 is a block diagram of a server upon which an example embodiment may be implemented.

FIG. 8 is a block diagram of a mobile device 800 with multiple transceivers 802, 804 upon which an example embodiment may be implemented. Mobile device 800 is suitable to implement the functionality of mobile device 208 (FIGS. 2-5). Mobile device 802 comprises a first wireless transceiver 802 which is configured to send and receive wireless signals employing a first protocol (for example WiFi) and a second wireless transceiver 804 that is configured to operate employing a second protocol (for example a cellular network). Controller 806 coupled to wireless transceivers 802, 804 is configured to send and receive data via wireless transceiver 802. Controller 804 may can be configured to implement the functionality described herein with reference to mobile device 208 (FIGS. 2-5) and may further employ logic for implanting the described functionality. For example, mobile device 800 can receive signals (for example passively receive beacons or actively by sending probe signals and waiting for responses to the probe signals) via wireless transceiver 802. Controller 806 can determine from the beacons whether the source of the beacon supports a network advertising protocol such as MSAP or a protocol compatible with the proposed 802.11u protocol. Controller 806 may also use data representative of available services to aid in selecting a connection to a network as well (for example which AP and with which SSID). Controller 806 can then send a signal via wireless transceiver 802 to request available services. Controller 806 may also generate a nonce to include in the signal sent via wireless transceiver 802. A response to the request can be received via wireless transceiver 802. Controller 806 can authenticate the response by employing any suitable technique, such as those described herein. For example, controller 806 can determine whether the response contains a signature For example, controller 704 can determine whether the response contains a signature that includes a Nonce, a hash of the request, a server DNS name, server certificate issuer name, server certificate serial number, server certificate URI, server certificate chain information, at least one service advertisement, other metadata, or any combination thereof. Controller 806 may employ the second transceiver 804 to retrieve a certificate. For example, referring to FIG. 3 with continued reference to FIG. 8, controller 806 may employ second wireless transceiver 804 to send certificate request message 360 and to receive the certificate response message 368. In an example embodiment, as illustrated in FIG. 3, controller 806 may generate a hash of the certificate request and compare it with a hash returned in response message 368. In particular embodiments, controller 806 may select a connection to a network based on data acquired in the Service Advertisement process. For example, controller 804 may determine whether to stay with an AP using a designated SSID or move to a different AP (and even a different network).

In an example embodiment, apparatus 800 further comprises a user interface 808 that enables controller 806 to output information about available services. For example, user interface may suitably comprise a video output capable of outputting an icon and/or textual description, and/or an audio output for outputting an audio signal, or combination audio and visual outputs. In particular embodiments, user interface 706 comprises a touch screen interface, and data (for example an icon) is displayed on the touch screen which enables a user to select the service by touching an area of the display associated with the data (e.g. Icon) for the desired service. In an example embodiment, controller 806 validates the response before outputting information about available services. If the response cannot be validated, no information is displayed. In another example embodiment, controller 806 outputs information without validating the response; however, upon selection of a service, the response is validated, and if the response cannot be validated, an output is generated to inform a user the service could be not be validated.

FIG. 9 is a block diagram of a server 900 upon which an example embodiment may be implemented. Server 900 is suitable to implement an advertisement server such as MSAP server 106 (FIGS. 1-5). Server 900 comprises an interface (such as a transceiver) 902 for sending and receiving signals and a controller 904 with logic for implementing the functionality described herein. In an example embodiment, server 900 comprises a single interface that communicates with an access network (AN, such as AP 204 in FIGS. 2-5). In an alternative embodiment, interface 902 comprises multiple interfaces. For example, a first interface may be employed for communicating with an AN, and a second interface for communicating with a service provider network, or a plurality of service provider networks.

In an example embodiment, controller 904 is further configured to respond to requests for advertising services. For example a Get MSAP services request as described in FIG. 3. Controller 904 may be configured to generate a list of available services. The list may be bound with a BSSID of the AP and other network data (such as SSID's corresponding to the available services). In particular embodiments, controller 904 may further include data representative of state information (for example a "cookie") in the response. In another example embodiment, controller 904 may generate a hash of the get services request and return the hash in the response. For example, the information may be hashed (SHA-256) and a signature can be generated by RSA encryption using a private key, or using (Digital Signature Algorithm (DSA) or ECDSA (Elliptic Curve Digital signature Algorithm) digital signatures using a private key. Controller 904 then sends the response via interface 902.

FIG. 10 illustrates an example of a computer system 1000 upon which an example embodiment may be implemented. Computer system 1000 is suitable for implementing logic 604 (FIG. 6) and/or logic 704 (FIG. 7), which may be employed for implementing the functionality of mobile device 208 (FIGS. 2-5) and server 206 (FIGS. 2-5).

Computer system 1000 includes a bus 1002 or other communication mechanism for communicating information and a processor 1004 coupled with bus 1002 for processing information. Computer system 1000 also includes a main memory 1006, such as random access memory (RAM) or other dynamic storage device coupled to bus 1002 for storing information and instructions to be executed by processor 1004. Main memory 1006 also may be used for storing temporary variable or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

In an example embodiment, for example when computer system 1000 is being employed to implement mobile device 108, computer system 1000 may be coupled via bus 1002 to a display 1012 such as a cathode ray tube (CRT) or liquid crystal display (LCD), for displaying information to a computer user. An input device 1014, such as a keyboard including alphanumeric and other keys is coupled to bus 1002 for communicating information and command selections to processor 1004. Another type of user input device is cursor control 1016, such as a mouse, a trackball, touch screen, or cursor direction keys for communicating direction information and command selections to processor 1004 and for controlling cursor movement on display 1012. This input device typically has two degrees of freedom in two axes, a first axis (e.g. x) and a second axis (e.g. y) that allows the device to specify positions in a plane.

An aspect of the example embodiment is related to the use of computer system 1000 for authenticating mobile device advertisements. According to an example embodiment, authenticating mobile device advertisements is provided by computer system 1000 in response to processor 1004 executing one or more sequences of one or more instructions contained in main memory 1006. Such instructions may be read into main memory 1006 from another computer-readable medium, such as storage device 1010. Execution of the sequence of instructions contained in main memory 1006 causes processor 1004 to perform the process steps described herein. One or more processors in a multi-processing arrangement may also be employed to execute the sequences of instructions contained in main memory 1006. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 1004 for execution. Such a medium may take many forms, including but not limited to non-volatile media, and volatile media. Non-volatile media include for example optical or magnetic disks, such as storage device 1010. Volatile media include dynamic memory such as main memory 1006. Common forms of computer-readable media include for example floppy disk, a flexible disk, hard disk, magnetic cards, paper tape, any other physical medium with patterns of holes, a RAM, a PROM, an EPROM, a FLASH-PROM, CD, DVD or any other memory chip or cartridge, or any other medium from which a computer can read.

Various forms of computer-readable media may be involved in carrying one or more sequences of one or more instructions to processor 1004 for execution. For example, the instructions may initially be borne on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1002 can receive the data carried in the infrared signal and place the data on bus 1002. Bus 1002 carries the data to main memory 1006 from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling computer system 1000 to a network link 1020 that is connected to a local network 1020. This allows computer system 1000 to communicate with other devices.

For example, communication interface 1018 may be a local area network (LAN) card to provide a data communication connection to a compatible LAN. As another example, communication interface 1018 may be an integrated services digital network (ISDN) card or a modem to provide a data communication connection to a corresponding type of telephone line. Wireless links may also be implemented. In any such implementation, communication interface 1018 sends and receives electrical, electromagnetic, or optical signals that carry digital data streams representing various types of information.

In view of the foregoing structural and functional features described above, a methodologies in accordance with example embodiments will be better appreciated with reference to FIGS. 11 and 12. While for purposes of simplicity of explanation, the methodologies of FIGS. 11 and 12 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies described herein. The methodologies described herein are suitably adapted to be implemented in hardware, software, or a combination thereof.

FIG. 11 illustrates an example of a methodology 1100 performed by a mobile device to obtain network advertising services. Methodology 1100 may be implemented by mobile device 108 described in FIGS. 1-5, logic 504 in FIG. 6, and/or processor 804 in FIG. 8.

At 1102, a signal is received that comprises data indicating that the source of the signal (for example an AP) has mobile service (such as Concierge and/or MSAP) advertising capabilities for advertising available network services. The signal may be a beacon, or a response sent to a probe signal.

At 1104, a request for available services is sent to the source of the beacon (for example an AP). The request may be a Generic Advertisement Service request. In particular embodiments, the request includes a nonce and/or a cookie. In an example embodiment, a hash of the request is generated. The hash is not sent but is employed to validate a response.

At 1106, a response to the request is received. In an example embodiment, the response comprises at least one provider declaration that includes at least one service advertisement, a nonce, a request hash, a certificate, and a signature. The service advertisement may include many different types of data as described herein. For example, the service advertisement may include data representative of an icon, a friendly (e.g., free form text) service name of the service provider, a service URI, recommended application, etc. (see e.g., service advertisement 100 in FIG. 1).

At 1108, the device receiving the response validates the response. In an example embodiment, the signature is validated using a public key for the source of the response (for example a server such as a MSAP server). In an example embodiment, the device receiving the response determines whether the signature cryptographically includes a provider declaration, at least one service brief, and a provider's icon. In particular embodiments, the receiving device verifies the signature includes hash of the request for available service, and if provided the nonce that was included in the request. In particular embodiments, the certificate chain in the response is validated with a trusted certificate authority.

If at 1108, the response is determined to be invalid, at 1110 communications is terminated (aborted) and the response is discarded. This prevents rogue devices from presenting icons and advertising services on a mobile device. This can also prevent phishing attacks and/or spam.

If at 1110, the response is determined to be valid, communications for determining network selection may continue. For example, an icon or other output (such as video, audio, audiovisual, etc.) may be output via a user interface. If an input is received indicating a selection of a particular service, a mobile device may associate with the ANP by using the NAI for the selected service.

In one example embodiment, the response is validated before an icon or other data is output on a device associated with the requestor. If the response cannot be validated, the advertisement is not displayed on the user device.

In another example embodiment, an icon or other data may be output on the user device (such as mobile device 208 in FIG. 2) and the response is validated responsive to receiving an input indicating the user is requesting a service (for example the user selects the icon). If the response cannot be validated no request is for the service is sent, and optionally an output is generated to inform the user the service advertisement could not be validated.

FIG. 12 illustrates an example of a methodology 1200 performed by a server to provide advertising services available from an associated network. Methodology 1200 may be implemented by MSAP server 206 described in FIGS. 2-5, logic 904 in FIG. 9 and/or processor 1004 in FIG. 10.

At 1202, the server receives a request for advertising services (for example a GAS request). In an example embodiment, the request is received from a wireless device via an access point. The request may be encapsulated in an IP datagram, in which case the IP header is removed.

At 1204, a hash is generated of the request. The hash may be generated using any suitable protocol.

At 1206, state information (such as a cookie) is obtained. The state information can be used by the server to prevent denial of service attacks.

At 1210, a response to the request is generated. The response generally includes a list of available services. The list may include service set identifiers where a service set identifier is associated with each available service. In addition the response may include a provider declaration and at least one service brief. The response may also include other data such as a certificate binding an icon (or a reference for getting an icon), service provider identity, and/or a certificate (or a reference (e.g., URI) for getting a certificate). In an example embodiment, response may also include other data such as an icon (or a reference for obtaining an icon), service provider identity, and/or a certificate (or a reference (e.g., URI) for getting a certificate). In an example embodiment, the server constructs a response that includes the provider declaration, at least one service brief, the nonce sent with the request and a hash of the request. In an example embodiment, the server constructs a response that includes an XML digital signature generated by a private key of the MSAP Server, the provider declaration, at least one service brief, and the nonce.

At 1212, the response is sent to the requestor. In an example embodiment, the response may be forwarded to an AP in communication with the requestor. For example, the request may be encapsulated with an IP header that is sent to the AP communicating with the requestor.

Described above are example embodiments. It is, of course, not possible to describe every conceivable combination of components or methodologies, but one of ordinary skill in the art will recognize that many further combinations and permutations of the example embodiments are possible. Although the above description describes a wireless network, those skilled in the art should readily appreciate that wireless network was described merely for ease of illustration and that the principles described herein are also suitably adaptable to wired networks. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a transceiver configured to send and receive data;
a user interface;
a controller coupled to the transceiver and the user interface;
wherein the controller is configured to receive a signal received from the transceiver, the signal comprising data representative of a protocol for advertising available services;
the controller is configured to send a request for available services via the transceiver responsive to receiving the signal;
the controller is configured to receive a response to the request for available services via the transceiver, wherein the response comprises at least one service advertisement that comprises at least one service brief, and a first signature;
wherein the service advertisement comprises data representative of a name of service provider and data representative of an icon for the service provider;
wherein the service brief comprises data representative of a description of an available service and data representative of a uniform resource indicator associated with the service;
wherein the first signature comprises a hash of the at least one service advertisement and the at least one service brief;
the controller validates the response to the request for available services, the controller validates the response by determining whether the hash comprises the data representative of the at least one service advertisement and the at least one service brief;
the controller sends a certificate request, via the transceiver, the certificate request comprises a nonce;
the controller receives, via the transceiver, a response to the certificate request, the response to the certificate request comprises a certificate and a second signature, the second signature comprises a hash of the certificate and the nonce;
the controller validates the response to the certificate request by verifying the second signature comprises a hash of the certificate and the nonce;
the controller sends, via the transceiver, a validate certificate chain request;
the controller receives, via the transceiver, a response to the validate certificate chain request;
the controller determines from the response to the validate certificate chain request whether the certificate has been revoked; and
the controller displays on, an associated user interface, an icon associated with the service brief responsive to validating the response to the request for available services, validating the response to the certificate request, and determining from the response to the validate certificate chain request that the certificate has not been revoked.

2. The apparatus set forth in claim 1, wherein the controller obtains a nonce;
wherein the request for available services further comprises the nonce; and wherein the controller is further configured to further validate the response to the request for available services by verifying the hash in the first signature includes the nonce.

3. The apparatus set forth in claim 1, further comprising a second wireless transceiver;
   wherein the controller validates the certificate request is sent via the second wireless transceiver;
   wherein the controller receives the response to the certificate request via the second wireless transceiver.

4. The apparatus set forth in claim 1, wherein the at least one service advertisement comprises data representative of an application on a mobile device for acquiring the service.

5. The apparatus set forth in claim 1, wherein the service advertisement further comprises data representative of a service provider domain name.

6. The apparatus set forth in claim 5, wherein the at least one service brief further comprises a service name, and a friendly service name.

7. The apparatus set forth in claim 5, wherein the at least one service brief further comprises data representative of a recommended application for accessing an advertised service.

8. The apparatus set forth in claim 5, wherein the at least one service brief further comprises keywords associated with an advertised service.

9. The apparatus set forth in claim 1, wherein the first signature is an Extensible Markup Language (XML) digital signature.

10. The apparatus set forth in claim 1, wherein the request for available services further comprises state information; and
    the controller validates the response to the request for available services further comprises determining whether the hash in the first signature includes the state information.

11. The apparatus set forth in claim 10, wherein the state information is received in a cookie.

* * * * *